United States Patent
Lei et al.

(10) Patent No.: US 7,102,697 B2
(45) Date of Patent: Sep. 5, 2006

(54) CONTRAST ENHANCEMENT OF DIGITAL IMAGES

(75) Inventors: Zhichun Lei, Stuttgart (DE); Piergiorgio Sartor, Fellbach (DE); Yalcin Inescu, Hamburg (DE); Peter Wagner, Waiblingen (DE)

(73) Assignee: Sony Deutschland GmbH, Cologne (DE)

( * ) Notice: Subject to any disclaimer, the term of this patent is extended or adjusted under 35 U.S.C. 154(b) by 571 days.

(21) Appl. No.: 10/372,680

(22) Filed: Feb. 24, 2003

(65) Prior Publication Data

US 2003/0161549 A1 Aug. 28, 2003

(30) Foreign Application Priority Data

Feb. 26, 2002 (EP) ................. 02004428

(51) Int. Cl.
*H04N 5/52* (2006.01)

(52) U.S. Cl. ........................ 348/678; 382/274
(58) Field of Classification Search ........... 348/671, 348/672, 673, 674, 678, 686; 382/168, 169, 382/171, 172, 274
See application file for complete search history.

(56) References Cited

U.S. PATENT DOCUMENTS

| 5,537,071 | A | | 7/1996 | Jaspers |
| 5,857,033 | A | | 1/1999 | Kim |
| 5,923,383 | A | | 7/1999 | Kim |
| 6,049,626 | A | * | 4/2000 | Kim ........................ 382/167 |
| 6,148,103 | A | * | 11/2000 | Nenonen .................... 382/169 |
| 6,373,533 | B1 | * | 4/2002 | Kawabata et al. .......... 348/672 |
| 6,650,774 | B1 | * | 11/2003 | Szeliski ..................... 382/169 |

FOREIGN PATENT DOCUMENTS

| EP | 0 383 269 | 8/1990 |
| EP | 1 022 679 | 7/2000 |

OTHER PUBLICATIONS

Gonzalez, R:, Woods, R.: "Digital Image Processing" 1992, Addison-Wesley, Reading, MA, USA, XP002206096, p. 173-180.
Alex Stark J: "Adaptive Image Contrast Enhancement Using Generalizations of Histogram Equalization" IEEE Transactions on Image Processing, IEEE Inc. New York, US, vol. 9, No. 5, May 2000, pp. 889-896, XP000958400.
Kim S-Y et al: "Image Contrast Enhancement Based on the Piecewise-Linear Approximation of CDF" IEEE Transactions on Consumer Electronics, IEEE Inc. New York, US, vol. 45, No. 3, Aug. 1999, pp. 828-834, XP000927001.
Jia-Guu Leu: "Image Contrast Enhancement Based on the Intensities of Edge Pixels" CVGIP Graphical Models and Image Processing, Academic Press, Duluth, MA, US, vol. 54, No. 6, Nov. 1, 1992, pp. 497-506, XP000332318.

* cited by examiner

*Primary Examiner*—Michael H. Lee
(74) *Attorney, Agent, or Firm*—Oblon, Spivak, McClelland, Maier & Neustadt, P.C.

(57) ABSTRACT

An adaptive histogram equalization method is introduced which allows the histogram equalization amount to automatically adapt to the original image contrasts, which can be measured from the originals. Contrast over-enhancement is avoided by limiting the spatial frequency response of the histogram. Besides that, methods to remedy the brightness change problem encountered by histogram equalization are described.

24 Claims, 6 Drawing Sheets processed by standard HE originals

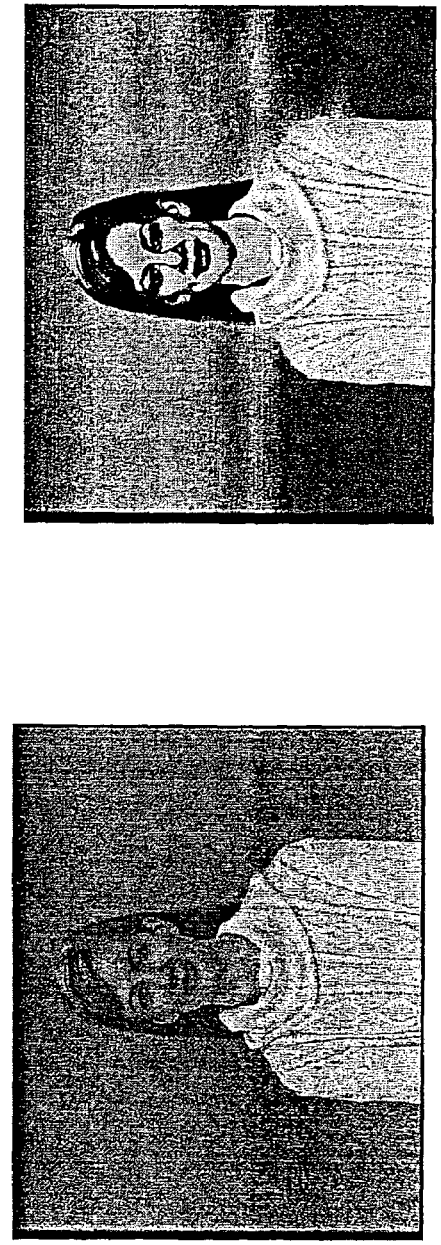
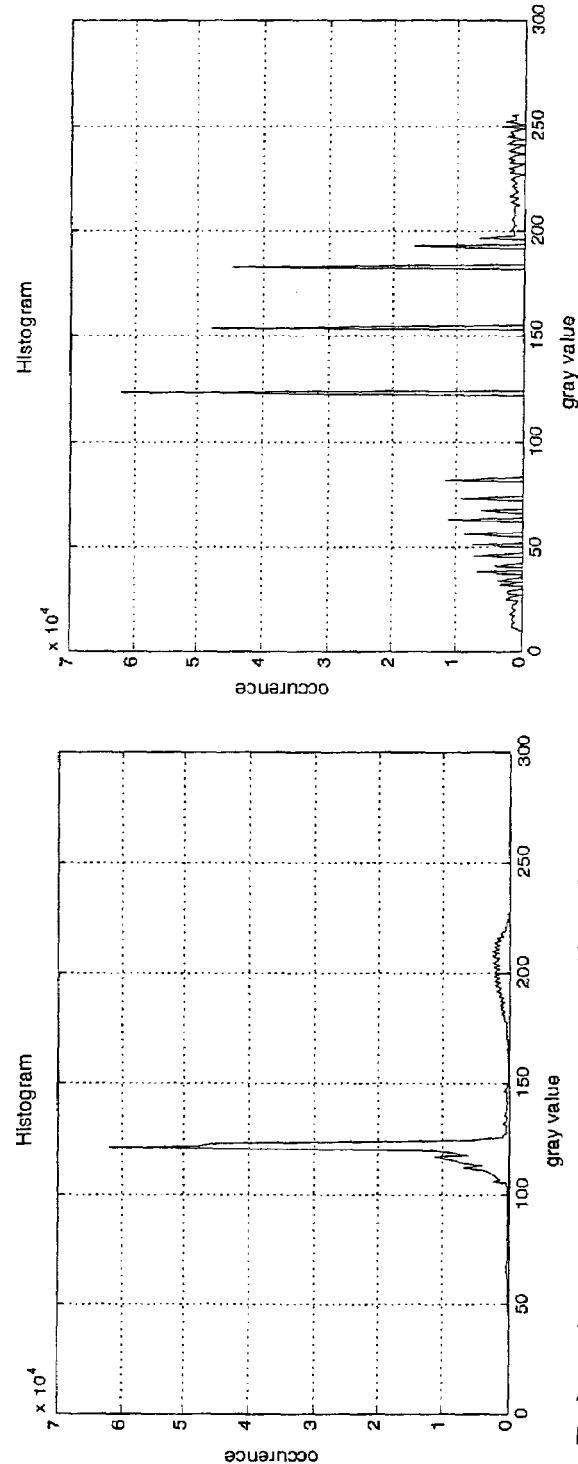
Fig. 2A  Prior Art
Fig. 2B

CONTRAST ENHANCEMENT OF DIGITAL IMAGES

This invention relates to a method for enhancing the contrast of digital images, and especially to TV image contrast enhancement. Furthermore, the invention relates to a contrast enhancement unit for improving the contrast of digital images.

Due to its simplicity and effectiveness, histogram equalization is a widely used method for enhancing the contrast of digital images. Histogram equalization can be divided into two categories, into a global approach and a local approach. Concerning the computational load, we prefer to apply global histogram equalization, and hereby will only discuss global histogram equalization, in particular for TV image contrast enhancement.

The underlying principle of histogram equalization is that for maximal image information perception the image luminance value distribution (histogram) should be uniform over the entire image intensity range. Through mapping the pixel luminance values by means of a histogram equalization transformation curve, the pixel luminance values of the transformed image are distributed as uniformly as possible over the whole dynamic range. Said "histogram equalization transformation curve" will be referred to as the "HE transformation curve" in the following.

The HE transformation curve can be obtained from the histogram of the original image. In order to generate the appropriate HE transformation curve, the cumulative histogram (also called Cumulative Distribution Function: CDF) is calculated by accumulating the histogram values. Next, the cumulative histogram is normalized such that a suitable transformation function for mapping the luminance levels is obtained.

However, sometimes the extent to which the image nature is changed by histogram equalization is undesirable for many applications. After performing a histogram equalization, it can happen that the image brightness is changed too much. For example, an image taken in the night looks like an image taken in the daytime. It can also happen that the natural impression is lost, for example in the human face area.

In the European Patent EP 383269 A2, "Regionally adaptive imaging techniques", a histogram filtering method is suggested which aims to avoid over-enhancement of the image noise.

In the U.S. Pat. No. 5,857,033 "Method for image enhancement using quantified mean separate histogram equalization and a circuit thereof" to Y.-T. Kim, the problem of too large brightness change is alleviated by splitting the image into two sub-images according to the image mean value. Each sub-image is independently histogram-equalized.

In the U.S. Pat. No. 5,923,383 "Image enhancement method using histogram equalization" to Y.-T. Kim, the brightness change problem is further alleviated. It is suggested that the number of occurrences of each luminance value is limited not to exceed a predetermined number in the course of calculating the histogram. However, it remains unsolved how to predetermine this number for different images. Besides, as already pointed out in the European Patent EP 383269, this kind of limiting would result in poor contrast enhancement for images with small intensity ranges.

The problem encountered by histogram equalization can be better solved by an approach described in U.S. Pat. No. 5,537,071 A "Method and circuit for dividing an input signal into amplitude segment signals and for non-linearity processing the amplitude segment signals on the basis of the value of each amplitude segment signal" to Cornelius A. M. Jaspers. According to this approach, the histogram is divided into several (e.g. 32) segments and the histogram entries of these segments are subtracted by their mean value. After that, an integration is carried out across these segments. Finally, weighted by a factor, the integration-resulting curve is mixed with a unit straight line to finally enhance the image contrast. However, the achieved histogram equalization amount is quite limited. In particular for poor contrast images, the enhancement amount is far from that desired and allowed by the image nature.

In the European Patent EP 1022679 A2 "Image processing system", it is suggested that the histogram is divided into several clusters and that histogram equalization or stretching is performed on each cluster. This histogram division is realized by a pattern matching technique, Gaussian and uniform distribution being separated into individual clusters. However, the histogram patterns are not only Gaussian and uniform, there are other kinds of pattern.

It is therefore an object of the invention to provide a method for enhancing the contrast of digital images and a contrast enhancement unit which perform the histogram equalization in a way that artefacts are avoided and that the modified images look more natural.

The object of the invention is solved by a method for enhancing the contrast of digital images according to claim 1, and by a contrast enhancement unit for improving the contrast of digital images according to claim 19. Preferred embodiments thereof are respectively defined in the respective following subclaims. A computer program product according to the present invention is defined in claim 30.

The inventive method enhances the contrast of digital images, whereby said digital images comprise a multitude of pixels, with each pixel being assigned a luminance level. In a first step, a histogram indicating the luminance level distribution of an original image is determined. Next, a characteristic measure $\Delta$ of the contrast of said original image is determined. Then, the histogram of the original image is equalized in order to improve the contrast, whereby the histogram equalization amount is varied as a function of said characteristic measure $\Delta$.

Instead of performing a total histogram equalization as in prior art solutions, the inventive solution allows for a partial histogram equalization. The amount of histogram equalization can be varied between no histogram equalization at all and a total histogram equalization, which will distribute the pixel luminance values as uniformly as possible over the whole dynamic range. According to the invention, the histogram equalization amount is automatically adapted to the image contrast. By analyzing the histogram of the original image, a characteristic measure $\Delta$ of the image contrast is determined.

In case the image contrast is high, the histogram equalization is unnecessary and can be switched off. In case of a low-contrast image, histogram equalization is switched on and a full histogram equalization can be achieved. In case the image contrast lies in between, an appropriate amount of histogram equalization is obtained.

One advantage of this solution is that good quality originals are not subjected to histogram equalization and therefore, their quality is not degraded. Another advantage is that artefacts due to histogram equalization, such as unnatural-looking human faces, can be avoided, because contrast enhancement is limited to the appropriate amount. Only as much histogram equalization as necessary is carried out.

Therefore, the overall quality of the images after the histogram equalization is improved.

Preferably, the histogram is equalized by transforming the luminance levels of the original image according to a HE transformation curve, in order to obtain modified luminance levels. The HE transformation curve translates the luminance levels of the original image into the modified luminance levels of the contrast-enhanced image. The HE transformation function is to be seen as a mapping curve, which maps each initial luminance value within the luminance value range to a corresponding target luminance value. The target luminance values are chosen in a way that after the initial luminance values have been mapped to the corresponding target luminance values, pixel by pixel, a contrast enhancement of the image is achieved.

Preferably, said HE transformation curve is generated by integrating and scaling the histogram. By accumulating the values of the original histogram, which is the luminance level distribution of the original image, the Cumulative Distribution Function (CDF) is obtained. The target value range of said Cumulative Distribution Function does not correspond to the range of luminance values yet and therefore, the Cumulative Distribution Function has to be scaled. By scaling the Cumulative Distribution Function, a HE transformation curve suitable for effecting a total histogram equalization is obtained.

Preferably, said characteristic measure $\Delta$ is obtained by evaluating the difference between the mean luminance level of the original image and a predefined constant, whereby a large difference indicates a low-contrast image. Usually, poor contrast is due to inappropriate lighting conditions; low-contrast images are either to dark or to bright. For this reason, the mean luminance level of low-contrast images is either much smaller or much larger than that of normal images. The deviation between the mean luminance value and a constant, e.g. 128 for the case of luminance values ranging from 0 to 255, is well-suited as a characteristic measure $\Delta$ of the image contrast and can easily be calculated.

According to another preferred embodiment of the invention, said characteristic measure $\Delta$ is obtained by evaluating the difference between the weighted distance from luminance level zero to the first significant histogram peak and the weighted distance from the last significant histogram peak to the maximum luminance level, whereby a large difference of said weighted distances corresponds to a low-contrast image. This criterion allows to detect whether the image as a whole is too dark or too bright. If the histogram peaks do not lie in the middle luminance level range, the image is perceived as a low-contrast image. In this case, a rather high amount of histogram equalization is appropriate.

Preferably, the summed-up empty space $\lambda_1$ between significant histogram peaks is considered when said characteristic measure $\Delta$ is determined, whereby a large amount of empty space $\lambda_1$ between the significant histogram peaks indicates a high-contrast image. All those luminance values which are not assigned to any pixel of the image are part of said empty space. Empty space in the histogram helps to distinguish different features of an image. Therefore, an image with a large amount of empty histogram space between the histogram peaks appears to be rich in contrast, and therefore, only a comparatively small amount of histogram equalization is required. Considering this additional criterion is helpful in keeping the amount of histogram equalization small.

Preferably, said significant histogram peaks are determined by checking where the gradient of the histogram or of the HE transformation curve exceeds a predefined threshold value. This gradient can be easily determined by subtracting adjacent histogram values from each other. In case the result of these subtractions exceeds the predefined threshold value, a significant peak of the histogram is detected.

Preferably, an edge image is determined by applying an edge detection operator to the original image, and considering both the contrast of the original image and the contrast of said edge image when determining said characteristic measure $\Delta$. Both for the original image and for the edge image, histograms are calculated. In case of the edge image, only the pixels around the edge positions are used for building the histogram. Thus, pixels within homogeneous regions, such as background, that do not contain as much information as the image edges, will not contribute significantly to the histogram of the edge image. In this embodiment, two different results for the characteristic measure $\Delta$ are obtained, one for the original image and one for the edge image. In this case, it is advantageous to select the value of $\Delta$ corresponding to the higher contrast as the relevant characteristic measure $\Delta$ for controlling the histogram equalization amount. By doing this, large homogeneous regions of the image will not necessarily cause a large amount of histogram equalization.

Preferably, said histogram is subjected to a low-pass filtering operation before the HE transformation curve is generated. A low-pass filter will eliminate the histogram's high frequency components. Only the frequency components below the low-pass filter's cut-off frequency, and especially the DC component, will pass the filter. Thus, the histogram will be smoothed, and the DC component as well as the low frequency components will be stressed. By integrating the smoothed histogram, the HE transformation curve is generated. Therefore, abrupt changes of the HE transformation curve caused by high-frequency fluctuations of the histogram are avoided. Another advantage is that low-pass filtering will remove noise disturbances from the histogram, and therefore, also the HE transformation curve will no longer be distorted by these noise disturbances. By limiting the frequency spectrum of the histogram to the frequency components below the cut-off frequency, an over-enhancement of the contrast is avoided.

According to a first preferred embodiment of the invention, said histogram equalization amount is varied by shifting the cut-off frequency $f_g$ of said low-pass filtering operation, whereby the larger the cut-off frequency $f_g$ is chosen, the larger the amount of histogram equalization will be.

Let us first consider the case that the low-pass filter's cut-off frequency is set to a rather high frequency. In this case, the various frequency components of the histogram will all pass the filter. The high-frequency components won't be attenuated much, and the histogram will mainly remain unchanged. The HE transformation function is obtained by integrating and scaling this histogram, which still contains its high frequency components and therefore looks rather rough. The obtained HE transformation function has the power of considerably affecting the original image's luminance levels. A high cut-off frequency will therefore lead to an almost total histogram equalization.

Let us next consider the opposite case that the low-pass filter's cut-off frequency is set to a rather small value. In this case, mainly the histogram's DC component will pass the filter. Integrating and scaling the DC component will give the unity straight transformation curve. If said unity straight transformation curve is used as a HE transformation function, the original image's luminance levels will not be changed at all. In case of a very low cutoff frequency, the original image will mainly remain unchanged. Heavy attenuation of the histogram's high-frequency components will therefore lead to a very small amount of histogram equalization.

In case said characteristic measure $\Delta$ indicates a high-contrast image, said cut-off frequency $f_g$ is shifted towards a lower frequency, and the histogram is heavily attenuated before the HE transformation curve is generated. In case said characteristic measure $\Delta$ indicates a low-contrast image, said cutoff frequency $f_g$ is shifted towards a higher frequency, and the histogram is only slightly attenuated before the HE transformation curve is generated. Within this patent application, a large $\Delta$ indicates a low-contrast image. Therefore, in order to realize an automatic control of the amount of histogram equalization as a function of the original image's contrast, it is sufficient to establish a direct proportionality between the cut-off frequency $f_g$ and the characteristic measure $\Delta$.

Preferably, in order to perform said low-pass filtering operation, a Fourier Transformation, preferably a Fast Fourier Transformation, is performed, and said low-pass filtering operation is carried out in the frequency domain. By performing a Fourier Transformation of the original histogram, the histogram's Fourier spectrum in the frequency domain is obtained. As soon as this Fourier spectrum is known, low-pass filtering can be effected by attenuating or removing all frequency components above the cut-off frequency $f_g$. According to this solution, it is possible to vary the filter characteristic and especially the cut-off frequency $f_g$ in the frequency domain. Alternatively, to perform said low-pass filtering operation, a forward and reverse IIR filtering operation might be performed, e.g. with a forward and reverse IIR filter.

Further preferably, said low-pass filtering means comprise a lookup table, in which a Fourier transformed low-pass filter characteristic is stored. The result of the Fourier Transformation of a specified smoothing filter is stored in the lookup table. To increase the cut-off frequency $f_g$, all that has to be done is to shift the Fourier transformation result toward right. For decreasing $f_g$, the result stored in the lookup table is shifted toward left.

According to a second preferred embodiment of the invention, said histogram equalization amount is varied by interpolating between a first low-pass filtered histogram corresponding to a first cut-off frequency $f_{g1}$ and a second low-pass filtered histogram corresponding to a second cut-off frequency $f_{g2}$ when determining said HE transformation curve. Here, two low-pass filtering operations with fixed cut-off frequencies $f_{g1}$ and $f_{g2}$ are performed, and it is possible to perform said two operations in parallel. According to this second embodiment of the invention, it is not necessary to allow for a shifting of the cut-off frequencies.

According to a third embodiment of the invention, said histogram equalization amount is varied by scaling the difference between the HE transformation curve and a unity straight transformation curve by means of a gain factor, whereby the smaller the gain factor is chosen, the lower the histogram equalization amount will be. According to this embodiment of the invention, the HE transformation curve is modified directly. No Fourier transformation of the histogram or of the HE transformation curve into the frequency domain is required. The method is computationally simple, because all that has to be done is to subtract the unity straight transformation from the HE transformation curve, scale the result of this subtraction, and add this scaled curve to the unity straight transformation function. This simple solution allows to continuously vary the amount of histogram equalization by means of the gain factor, which may take values between 0 and 1.

According to a first preferred solution for the brightness change problem, the luminance levels of the image after the histogram equalization are scaled by the ratio of the mean luminance levels of the image before and after the histogram equalization. Said ratio of the mean luminance levels only has to be calculated once for the whole image.

According to a second preferred solution for the brightness change problem, the luminance levels of the image after the histogram equalization are shifted by the difference of the mean luminance levels of the image before and after the histogram equalization. According to this second solution for the brightness change problem, only add and subtract operations are used for adapting the luminance levels, which helps to considerably reduce the computational load.

According to a third preferred solution for the brightness change problem, the luminance levels of the image are corrected after the histogram equalization according to the luminance level shift of the histogram peaks or a selected reference point caused by the histogram equalization. By tracking the histogram's significant peak, the amount of brightness change can easily be detected.

Preferably, the HE transformation curve is modified in a way that for a certain range of luminance levels, said HE transformation curve is replaced by a unity straight transformation curve. In case an image contains a large part of dark region and a small part of bright region, a global histogram equalization method would improve the contrast of this kind of image in the dark region, but details in the bright region are lost more or less. In this case, it is advantageous to only improve the contrast in the dark region, and to leave the luminance levels in the bright region unchanged. This can be achieved by replacing the HE transformation curve by a unity straight transformation curve within the bright region. Thus, loss of details in the bright region can be avoided. A similar processing method can be applied to images with a large part of bright region and a small part of dark region.

Further features and advantages of preferred embodiments according to the present invention will be explained below in conjunction with the accompanying drawings, in which FIG. 1A shows an image taken at night, together with the corresponding histogram, before equalization of the histogram;

FIG. 2A shows a high-contrast image of a human face, together with the corresponding histogram, before histogram equalization;

FIG. 2B shows the image of FIG. 2A after a total histogram equalization according to the prior art has been carried out;

Figure 4B:
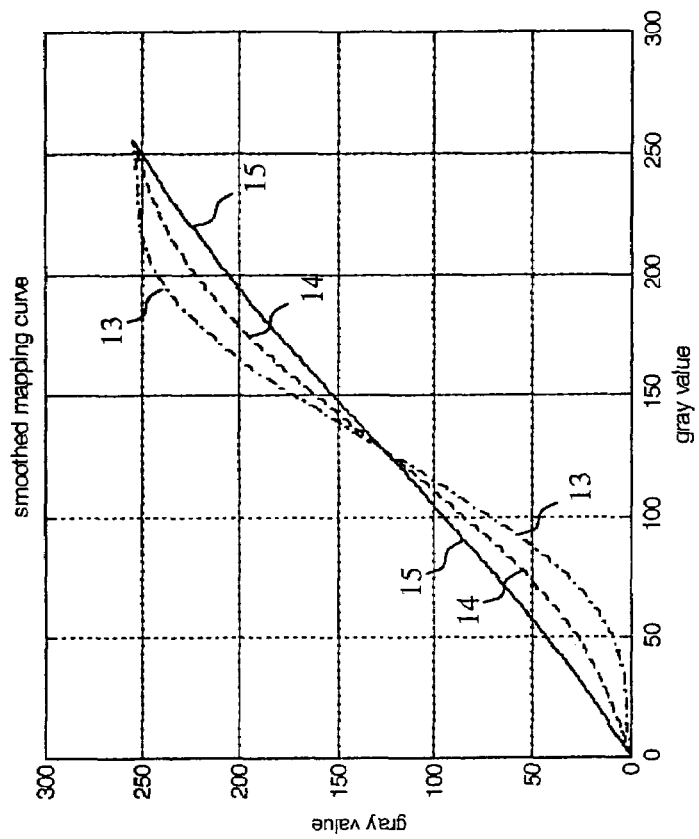
Figure 4A:
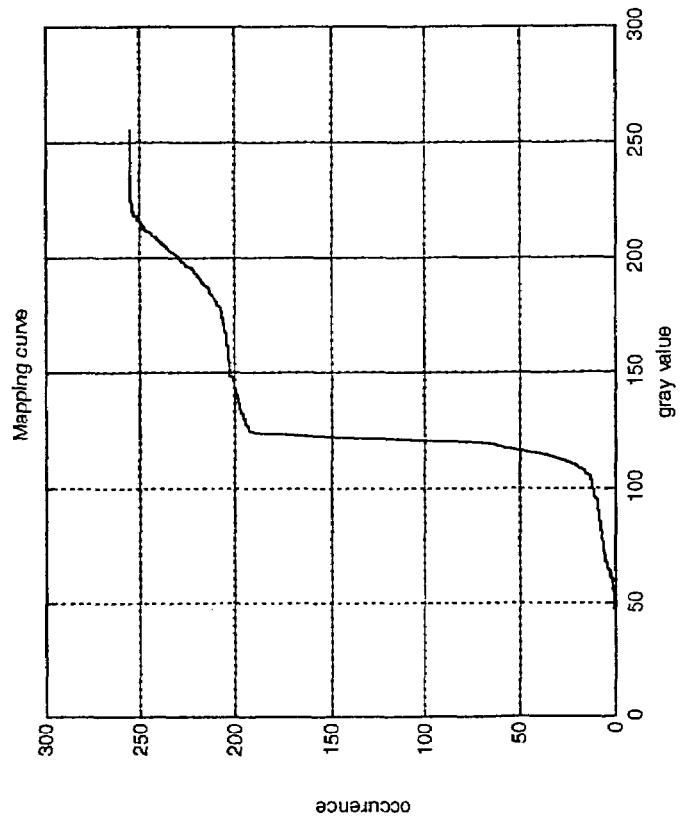
Figure 5:
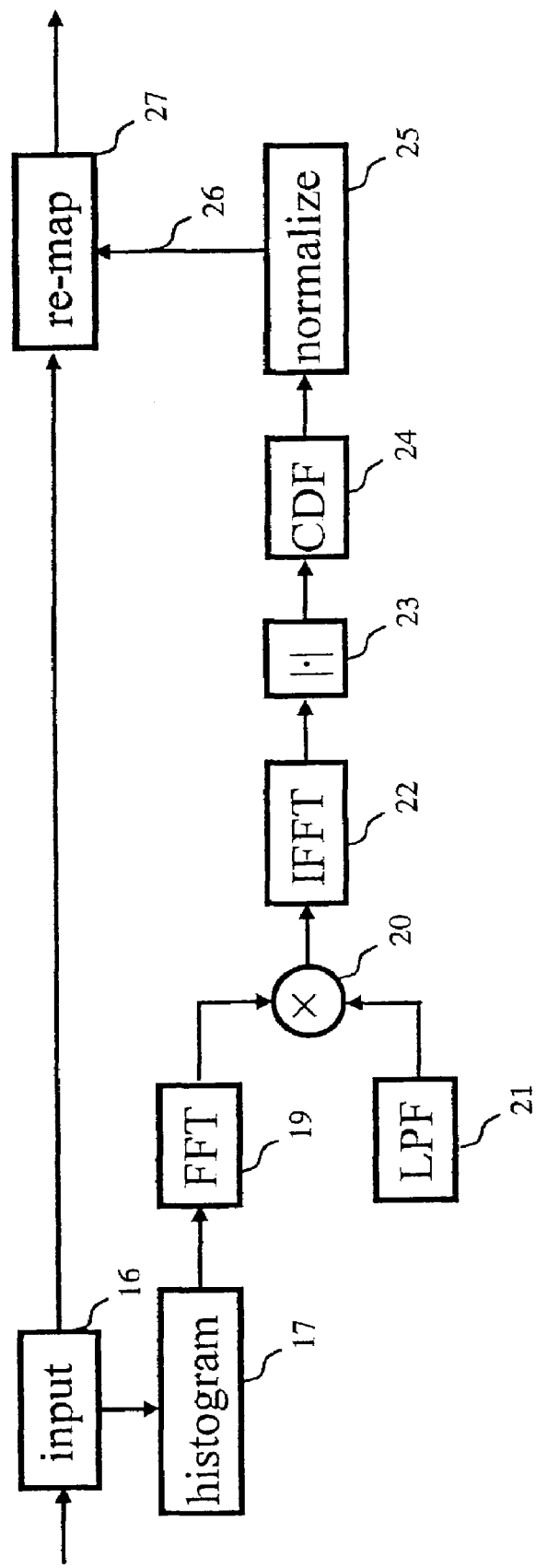
Figure 6:
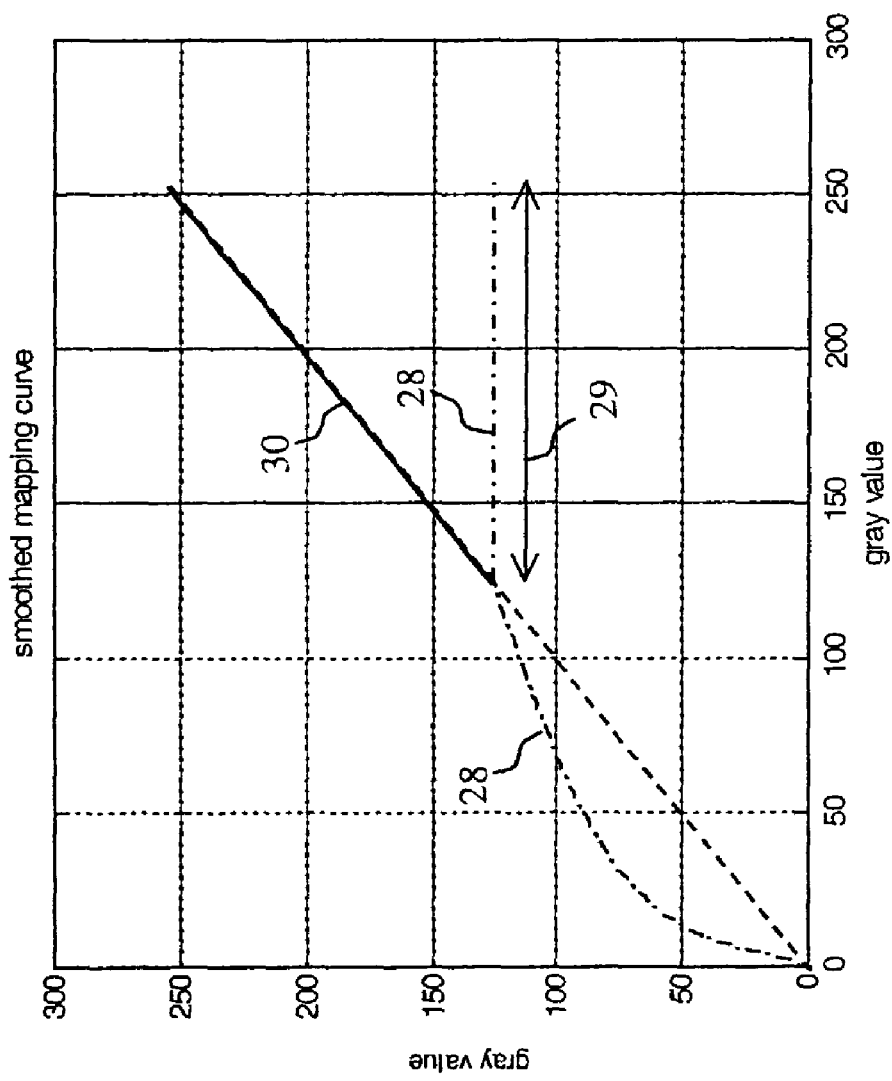

FIG. 4A gives an example of a Cumulative Distribution Function obtained by integrating an original histogram;

FIG. 4B gives several examples of smoothed HE transformation curves which equalize the histogram only partially;

FIG. 5 shows a histogram equalization unit according to the invention, which comprises low-pass filtering means;

FIG. 6 gives an example how the HE transformation curve can be replaced by the unity straight transformation curve within a predefined range of luminance levels.

Figure 1B:
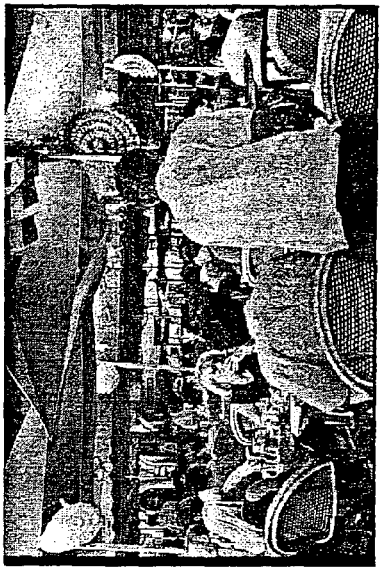
FIG. 1B shows the image of FIG. 1A after a total histogram equalization according to the prior art has been performed.
Figure 1B:
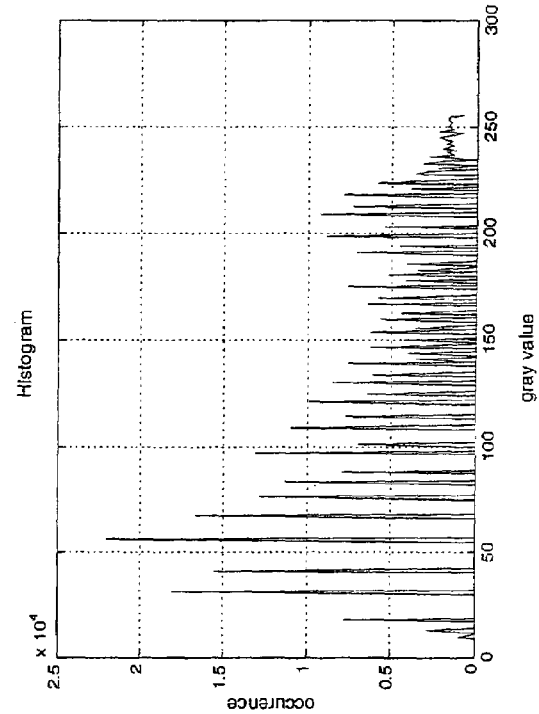
Figure 1A:
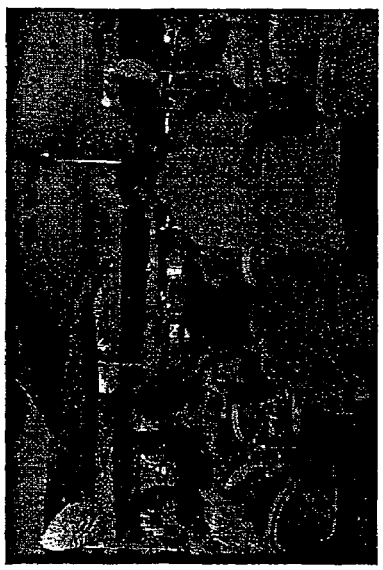
Figure 1A:
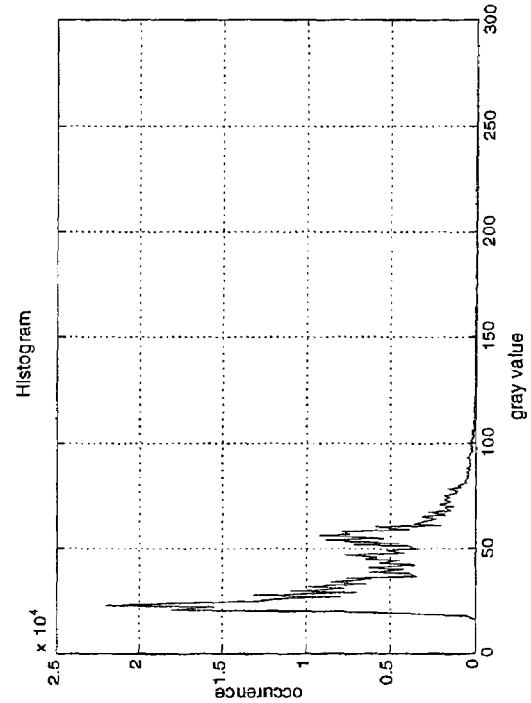

In FIG. 1A, an image taken at night is shown, together with its corresponding histogram. The significant peaks are located within the region of gray levels below the luminance value 128. When applying a full histogram equalization according to the prior art to said image, a modified image is obtained, which is shown in FIG. 1B. From the histogram corresponding to said modified image, it can be seen that the significant peaks are now distributed within the whole range of luminance values. The optical impression of the image shown in FIG. 1B is not convincing. Though the image has been taken at night, it looks like an image taken in the daytime.

In FIG. 2A, another image is shown together with its corresponding histogram. After applying a total histogram equalization according to the prior art, the image given in FIG. 2B is obtained. The image of FIG. 2B shows typical artefacts which arise when the contrast is enhanced too much. The face of the woman looks unnatural, because the contrast appears exaggerated. Here, a lower amount of histogram equalization would have led to a more convincing result.

According to the invention, the histogram equalization amount is automatically adapted to the image contrast. In case the image contrast is high, the histogram equalization is unnecessary and can be switched off. In case the image contrast is low, histogram equalization is switched on and a full histogram equalization is achieved. When the image contrast lies in between, an appropriate amount of histogram equalization effect is obtained.

First, the contrast of the original image has to be analyzed. For low contrast images, the major histogram peaks tend to lie on the low luminance values or high luminance values side. This is due to the fact that an inappropriate lighting condition, which results in poor contrast images, is either too dark or too bright. When the histogram peaks lie in the middle luminance value range, the image is normally not observed as poor contrast. The images also appear contrast-rich when there exists empty spaces (i.e. no pixels occupy these luminance values) among histogram peaks. In fact, the histogram equalization effect supports this view, because histogram equalization also causes empty histogram spaces to increase image contrast.

According to a first method for determining a characteristic measure $\Delta$ of the image contrast, the characteristic measure $\Delta$ is calculated as follows:

$$\Delta = k_0 \times \max(\lambda_0, \lambda_2) - k_2 \times \min(\lambda_0, \lambda_2) - k_1 \times \lambda_1 \quad (1)$$

$\lambda_0$ and $\lambda_2$ respectively stand for the distance from luminance level zero to the first significant histogram peak, and from luminance level 255 to the last significant histogram peak. $\lambda_1$ stands for the sum of the empty histogram spaces among significant histogram peaks. $k_0$, $k_1$ and $k_2$ are three pre-defined factors. They can be, for example, selected as one, and thus:

$$\Delta = \max(\lambda_0, \lambda_2) - \min(\lambda_0, \lambda_2) - \lambda_1. \quad (2)$$

In practice, $\Delta$ has to be clipped against a lower and upper limit.

If most of the pixels only occupy the lower luminance value ranges, for instance, then $\lambda_2$ is larger than $\lambda_0$, $\max(\lambda_0, \lambda_2)$ takes the value of $\lambda_2$, and $\min(\lambda_0, \lambda_2)$ takes the value of $\lambda_0$. The subtraction of $\min(\lambda_0, \lambda_2)$ aims to cope with the case that most of the pixels lie in the middle luminance value range. As result, $\Delta$ in equation (1) or (2) takes a smaller value for proper lighting condition. The subtraction of $\lambda_1$ takes the empty histogram spaces into account. If $\lambda_1 \neq 0$, $\Delta$ will become smaller, so that the histogram equalization amount is reduced. Besides $\lambda_1$, the histogram equalization amount is strongly dependent on $k_1$. The larger $k_1$, the less the histogram equalization amount will become.

The position of the significant histogram peaks can be obtained by analyzing the gradient of the HE transformation curve. If the gradient of the integer format HE transformation curve is less than two, said curve will not further contribute to change the original luminance value. Thus, significant peaks are detected where the gradient is not less than two. Correspondingly, one can also get a similar criterion from the histogram.

Next, a second method for determining a characteristic measure $\Delta$ of the image contrast is described. For low contrast image, the mean luminance value of the image is either much smaller or much larger than that of normal images. The deviation between the image mean value and a constant, e.g. 128 for 8-bits quantized image, can be used as a characteristic measure of the image contrast, and said characteristic measure can be used for controlling the histogram equalization amount.

Normally, the histogram is built from the original image. However, in the article "Image contrast enhancement based on the intensities of edge pixels", CVGIP: Graphical Models and Image Processing, Vol. 54, No. 6, November 1992, pp. 497–506, J.-G. Leu has pointed out that it is advantageous with respect to reducing noise amplification and improving contrast if the histogram is calculated from the edge image, which can be detected from the original image by means of a well-known edge detection operator. Only the pixels around the edge positions are used to build the histogram. Thus, the pixels in homogeneous regions, such as background, that do not contain as much information as the image edges, will no more dominate the histogram. The histogram entries correspond to the image structures. It is therefore helpful to prevent information loss caused by histogram equalization. Besides, only the edges in the image center area are used to determine the histogram so that some contents like black bars of PALplus TV signals can be prevented from affecting the histogram.

The image contrast can be measured from the histogram or the CDF of the originals. To reliably measure the image contrast, histograms are calculated both from the original image and from the edge image. Both for the histogram of the original image and for the histogram of the edge image, the characteristic measure $\Delta$ of the image contrast is calculated. In case one obtains two different results for $\Delta$, the smaller one is selected to control the histogram equalization amount. Selecting the smaller one of said two values of $\Delta$ helps to avoid an over-enhancement of the image contrast.

To avoid that the image nature is changed too much, one has to reduce the histogram equalization amount. This can be realized by modifying the histogram in frequency domain.

Figure 3:
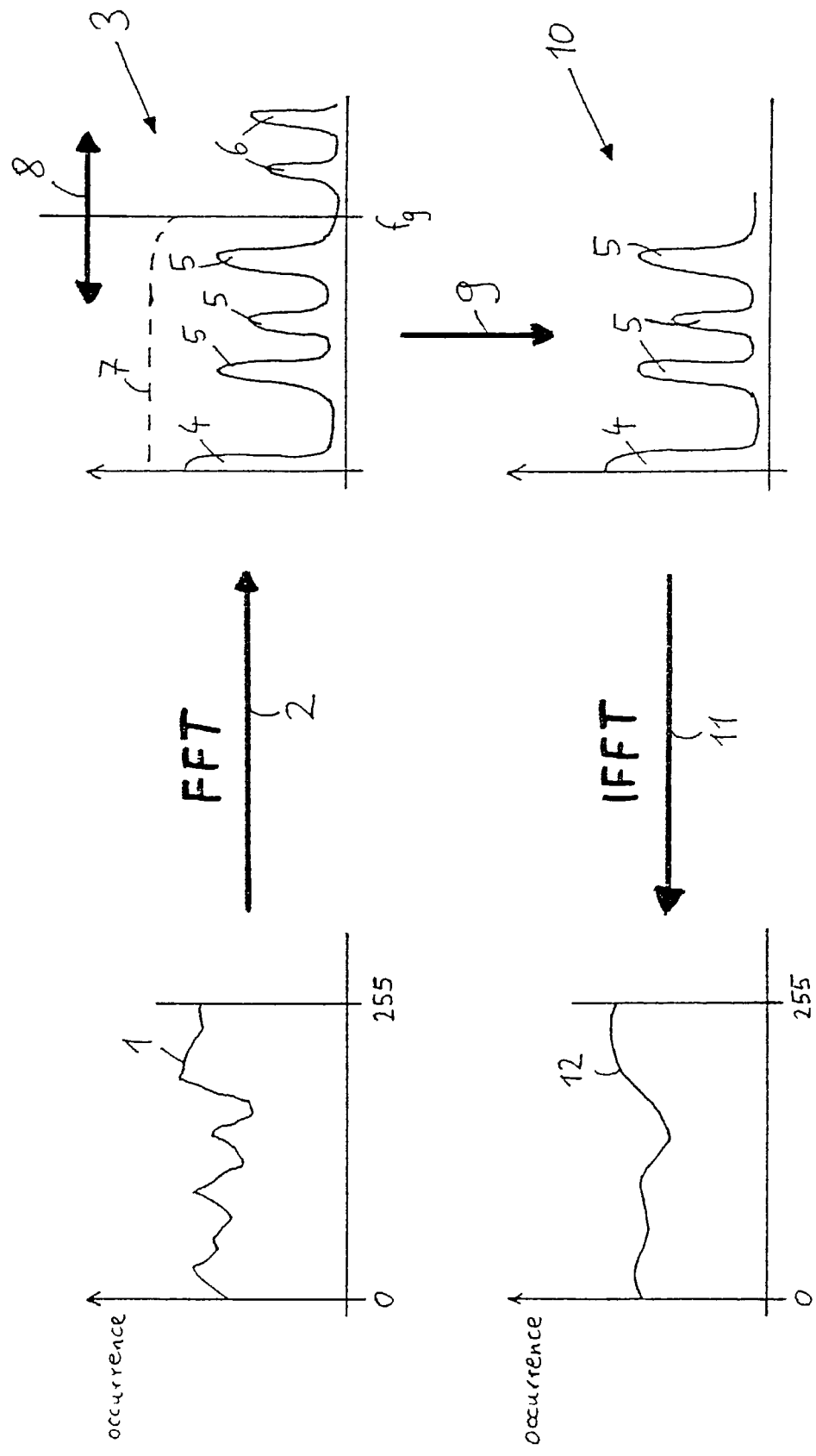
FIG. 3 shows how the histogram equalization amount can be varied by performing a low-pass filtering of the original histogram.

The inventive method for adapting the amount of histogram equalization is shown in FIG. 3. The original histogram 1 is subjected to a Fourier transformation 2, preferably to a Fast Fourier Transformation, and thus the frequency spectrum 3 of the original histogram 1 is obtained. The frequency spectrum 3 comprises a DC component 4, low-frequency components 5 and high-frequency components 6. In order to reduce the histogram equalization amount, the high-frequency components 6 are attenuated by a low-pass filtering operation. The frequency characteristic 7 of the low-pass filter is also shown in FIG. 3. The low-pass filtering attenuates all the frequency components above the cut-off frequency $f_g$, while the frequency components below the cut-off frequency $f_g$ remain unchanged.

The amount of histogram equalization can be varied by shifting 8 the cut-off frequency $f_g$. By limiting the high frequency components, the image contrast over-enhancement can be prevented. The stronger the higher frequency components are attenuated, the less the histogram equalization amount is kept. If only the DC component is allowed to pass, one obtains a unity straight line. Therefore, a large cut-off frequency $f_g$ corresponds to a slight attenuation of the histogram and to a large amount of histogram equalization. A low cut-off frequency corresponds to a large attenuation of the histogram and to a small amount of histogram equalization.

As a result of the low-pass filtering 9, the frequency spectrum 10 is obtained. Only the DC component 4 and the low-frequency components 5 have survived the low-pass filtering 9. By performing an inverse Fourier transformation 11, the filtered histogram 12 is obtained. Compared to the original histogram 1, the filtered histogram 12 has been smoothed. The low-pass filtering makes the histogram equalization less sensitive to noise disturbance.

Alternatively, said low-pass filtering operation can be carried out by a forward and reverse IIR filter, i.e. after filtering in the forward direction, the filtered sequence is then reversed and run back through the filter.

In FIG. 4A, the Cumulative Distribution Function for a certain luminance level distribution, or histogram, is shown. By scaling this Cumulative Distribution Function, one could obtain a HE transformation function for performing a total histogram equalization.

In FIG. 4B, three different HE transformation curves 13, 14, 15 for performing a partial histogram equalization are shown, which correspond to the same luminance level distribution as the Cumulative Distribution Function shown in FIG. 4A. The curve 15 has been obtained by integrating a heavily attenuated histogram, which could have been obtained by a low-pass filtering operation with a rather low cut-off frequency. The curve 15 is very close to the unity straight transformation curve, and therefore, the amount of histogram equalization obtained by applying curve 15 to the image is rather low. The HE transformation curve 15 is well-suited for high-contrast images.

Accordingly, the HE transformation curve 13 could have been obtained by integrating a histogram that has not been attenuated too much. Such a slight attenuation corresponds to a low-pass filter with a high cut-off frequency. By applying the HE transformation curve 13 to the image, the distribution of the luminance levels is changed considerably. A luminance value of 200 will be shifted towards a much brighter luminance value of approximately 240. The contrast is enhanced significantly, and therefore, the HE transformation curve 13 is well-suited for low-contrast images. Curve 13 thus corresponds to a large amount of histogram equalization.

In FIG. 5, a hardware implementation of the contrast enhancement unit according to the invention is shown. For the input image 16, a histogram 17 is calculated. The histogram 17 is forwarded to a FFT unit 19, and the frequency spectrum of the histogram 17 is forwarded to the multiplier 20, where it is multiplied with a low-pass filter characteristic that is stored in the lookup table 21. The low-pass filtered frequency spectrum is forwarded to an IFFT unit 22, which generates a smoothed histogram. The smoothed histogram is integrated by the integrating unit 23, and thus, the smoothed Cumulative Distribution Function 24 is generated. After normalizing the Cumulative Distribution Function 24 in the scaling unit 25, the HE transformation curve 26 is obtained, which is used for a remapping 27 of the input image 16.

The automatic histogram equalization amount control can be realized by making $f_g$ proportional to $\Delta$, or by making the filter order inverse proportional to $\Delta$. That is, for different image contrasts one can optimally obtain the histogram equalization amount by adaptive adjusting $f_g$.

According to a second embodiment of the invention, one can also obtain two smoothed histograms by performing two low-pass filtering operations with two different cut-off frequencies $f_{g1}$ and $f_{g2}$. The strongest frequency attenuation response corresponds to a low cut-off frequency and to high-contrast images, whereby the least frequency attenuation response corresponds to a high cut-off frequency $f_g$ and to low-contrast images. When the measured image contrast lies in between, the histogram equalization amount will be interpolated from the strongest and the least frequency attenuation responses.

According to a third embodiment of the invention, one can subtract the unity straight transformation curve from the HE transformation curve obtained by smoothing the original histogram. This difference is multiplied with a gain factor ranging from zero to one, and then added to the unity straight transformation curve. If this gain factor is changed, different HE amounts can be achieved. In this way, the HE amount can also be adapted to the measured image contrast.

As already mentioned, one of the problems frequently encountered by histogram equalization is the significant image brightness change before and after histogram equalization processing. In the following, we will discuss two methods to remedy this problem.

In the following, a first preferred solution to the brightness change problem is described. First, the mean values of the image before and after histogram equalization are calculated. The mean values can be calculated either directly by means of summing image pixel luminance values, or indirectly by means of the histogram. The latter mean calculation method is advantageous with respect to computational load reduction. The ratio of the mean values of the images before and after histogram equalization is used to scale the pixel luminance values of the histogram equalization resulting image. If the histogram equalization resulting image has a larger brightness than the originals, all of the pixels of the histogram equalization resulting image are down-scaled, otherwise they are up-scaled. In this way, it can be achieved that the image brightness before and after histogram equalization almost remains the same.

Next, a second preferred solution to the brightness change problem is described. Instead of calculating the ratio between the mean values of the images before and after histogram equalization, one can calculate their difference. This allows to further reduce the computational load, because the number of time-consuming dividing and multiplying operations is reduced.

If the mean value of the histogram equalization resulting image is larger than that of the originals, all of the pixels of the histogram equalization resulting image are decreased by this difference. Otherwise, they are increased by this difference. In this way, one only needs adding or subtracting operation to remedy the brightness change problem caused by histogram equalization. From our simulation results, we do not observe any information loss caused by this kind of subtraction or addition. This can be explained as follows. Let us at first discuss the case that after histogram equalization the image brightness becomes larger. This case corresponds that the luminance values of the pixels, in particular those of dark pixels, in the originals are amplified. Thus, it will help keep the image nature if one removes an offset value from the amplified pixels. On the contrary, if the image brightness is reduced due to histogram equalization processing, it means that the luminance values of the pixels, in particular those of bright pixels, are attenuated. It is just desired if the pixels are added by an offset value. This offset can take the mean difference value between the images before histogram equalization and after histogram equalization. A better impression can be achieved if this mean difference value is multiplied by a positive fractional factor because empirically the image usually appears well if it becomes relative brighter. This is particularly true for dark images.

Next, a third preferred solution to the brightness change problem is described. The image brightness change problem can also be remedied by examining the histogram peaks or a selected reference point. Significant image brightness change is usually caused by histogram peaks. If a histogram is relative uniformly distributed, histogram equalization will not cause significant brightness change problem. Therefore, one can detect the position shift of the histogram peaks or a selected reference point before and after histogram equalization, and correct the pixel luminance value of the histogram equalization resulting image by this detected shift.

Because the three methods discussed above change the luminance value of the whole pixels, they do not change the image contrast.

As already emphasized, histogram equalization performs best on poor contrast images, e.g. images with details "hidden" in dark regions. However, an image can contain both dark and bright regions, for instance, a large part of dark region and a small part of bright region. If one checks its histogram, one can observe empty spaces between major accumulations (or peaks). Although global histogram equalization method can improve the contrast of this kind of image in dark region, details in bright region may be lost more or less. Because one aims to improve the contrast in dark region, the pixels in bright region can remain unchanged.

In FIG. 6, it is shown how the HE transformation curve 28 can be replaced, in the region 29 from luminance level 128 to luminance level 255, by a corresponding unity straight line 30. The resulting HE transformation curve can be smoothed before it is used for transforming the luminance levels of the image.

A similar processing method can be applied to images with a large part of bright region and a small part of dark region so that possible detail loss in the dark region can be prevented.

The invention claimed is:

1. Method for enhancing the contrast of digital images, said digital images comprising a multitude of pixels with each pixel being assigned a luminance level, characterized by the following steps:
   determining a histogram indicating the luminance level distribution of an original image;
   determining a characteristic measure ($\Delta$) of the contrast of said original image;
   equalizing the histogram of the original image in order to improve the contrast, whereby the histogram equalization amount is varied as a function of said characteristic measure ($\Delta$);
   characterized in that the histogram is equalized by transforming the luminance levels of the original image according to an HE transformation curve, in order to obtain modified luminance levels,
   said HE transformation curve is generated by integrating and scaling the histogram, and
   said characteristic measure ($\Delta$) is obtained by evaluating the difference between the mean luminance level of the original image and a predefined constant, whereby a large difference indicates a low-contrast image.

2. Method for enhancing the contrast of digital images, said digital images comprising a multitude of pixels with each pixel being assigned a luminance level, characterized by the following steps;
   determining a histogram indicating the luminance level distribution of an original image;
   determining a characteristic measure ($\Delta$) of the contrast of said original image;
   equalizing the histogram of the original image in order to improve the contrast whereby the histogram equalization amount is varied as a function of said characteristic measure ($\Delta$)
   characterized in that the histogram is equalized by transforming the luminance levels of the original image according to an HE transformation curve, in order to obtain modified luminance levels,
   said HE transformation curve is generated by integrating and scaling the histogram, and
   said characteristic measure ($\Delta$) is obtained by evaluating the difference between the weighted distance from luminance level zero to the first significant histogram peak and the weighted distance from the last significant histogram peak to the maximum luminance level, whereby a large difference of said weighted distances corresponds to a low-contrast image.

3. Method according to claim 2, characterized in that the summed-up empty space ($\lambda 1$) between significant histogram peaks is considered when said characteristic measure ($\Delta$) is determined, whereby a large amount of empty space ($\lambda 1$) between the significant histogram peaks indicates a high-contrast image.

4. Method according to claim 2, characterized by determining said significant histogram peaks by checking where the gradient of the histogram or of the HE transformation curve exceeds a predefined threshold value.

5. Method for enhancing the contrast of digital images, said digital images comprising a multitude of pixels, with each pixel being assigned a luminance level, characterized by the following steps;
   determining a histogram indicating the luminance level distribution of an original image;
   determining a characteristic measure ($\Delta$) of the contrast of said original image;
   equalizing the histogram of the original image in order to improve the contrast, whereby the histogram equalization amount is varied as a function of said characteristic measure ($\Delta$),
   characterized in that the histogram is equalized by transforming the luminance levels of the original image according to an HE transformation curve, in order to obtain modified luminance levels,
   said HE transformation curve is generated by integrating and scaling the histogram,
   the summed-up empty space ($\lambda 1$) between significant histogram peaks is considered when said characteristic measure ($\Delta$) is determined, whereby a large amount of empty space ($\lambda 1$) between the significant histogram peaks indicates a high-contrast image, determining said significant histogram peaks by checking where the gradient of the histogram or of the HE transformation curve exceeds a predefined threshold value, characterized in that said characteristic measure ($\Delta$) is obtained by evaluating the difference between the weighted distance from luminance level zero to the first significant histogram peak and the weighted distance from the last significant histogram peak to the maximum luminance level, whereby a large difference of said weighted distances corresponds to a low-contrast image, characterized by determining an edge image by applying an edge detection operator to the original image, and considering both the contrast of the original image and the contrast of said edge image when determining said characteristic measure ($\Delta$).

6. Method according to claim 5, characterized by subjecting said histogram to a low-pass filtering operation before an HE transformation curve is generated.

7. Method according to claim 6, characterized in that said histogram equalization amount is varied by shifting the cut-off frequency (fg) of said low-pass filtering operation, whereby the larger the cut-off frequency (fg) is chosen, the larger the amount of histogram equalization will be.

8. Method according to claim 6, characterized in that in case said characteristic measure ($\Delta$) indicates a high-contrast image, said cut-off frequency (fg) is shifted towards a lower frequency, and the histogram is heavily attenuated before the HE transformation curve is generated, whereby in case said characteristic measure ($\Delta$) indicates a low-contrast image, said cut-off frequency (fg) is shifted towards a higher frequency, and the histogram is only slightly attenuated before the HE transformation curve is generated.

9. Method according to claim 8, characterized in that in order to perform said low-pass filtering operation, a Fourier Transformation, preferably a Fast Fourier Transformation, is performed and said low-pass filtering operation is carried out in the frequency domain or by performing a forward and reverse IIR filtering operation.

10. Method for enhancing the contrast of digital images said digital images comprising a multitude of pixels with each pixel being assigned a luminance level, characterized by the following steps;

determining a histogram indicating the luminance level distribution of an original image;

determining a characteristic measure ($\Delta$) of the contrast of said original image; equalizing the histogram of the original image in order to improve the contrast, whereby the histogram equalization amount is varied as a function of said characteristic measure ($\Delta$);

characterized in that the histogram is equalized by transforming the luminance levels of the original image according to an HE transformation curve, in order to obtain modified luminance levels, said HE transformation curve is generated by integrating and scaling the histogram, the summed-up empty space ($\lambda1$) between significant histogram peaks is considered when said characteristic measure ($\Delta$) is determined, whereby a large amount of empty space ($\lambda1$) between the significant histogram peaks indicates a high-contrast image, determining said significant histogram peaks by checking where the gradient of the histogram or of the HE transformation curve exceeds a predefined threshold value, said characteristic measure ($\Delta$) is obtained by evaluating the difference between the weighted distance from luminance level zero to the first significant histogram peak and the weighted distance from the last significant histogram peak to the maximum luminance level, whereby a large difference of said weighted distances corresponds to a low-contrast image, determining an edge image by applying an edge detection operator to the original image, and considering both the contrast of the original image and the contrast of said edge image when determining said characteristic measure ($\Delta$), and said histogram equalization amount is varied by interpolating between a first low-pass filtered histogram corresponding to a first cut-off frequency (fg1) and a second low-pass filtered histogram corresponding to a second cut-off frequency (fg2) when determining said HE transformation curve.

11. Method for enhancing the contrast of digital images, said digital images comprising a multitude of pixels, with each pixel being assigned a luminance level, characterized by the following steps;

determining a histogram indicating the luminance level distribution of an original image;

determining a characteristic measure ($\Delta$) of the contrast of said original image;

equalizing the histogram of the original image in order to improve the contrast whereby the histogram equalization amount is varied as a function of said characteristic measure ($\Delta$), characterized in that the histogram is equalized by transforming the luminance levels of the original image according to an HE transformation curve, in order to obtain modified luminance levels, an HE transformation curve is generated by integrating and scaling the histogram, the summed-up empty space ($\lambda1$) between significant histogram peaks is considered when said characteristic measure ($\Delta$) is determined, whereby a large amount of empty space ($\lambda1$) between the significant histogram peaks indicates a high-contrast image, determining said significant histogram peaks by checking where the gradient of the histogram or of the HE transformation curve exceeds a predefined threshold value, said characteristic measure ($\Delta$) is obtained by evaluating the difference between the weighted distance from luminance level zero to the first significant histogram peak and the weighted distance from the last significant histogram peak to the maximum luminance level, whereby a large difference of said weighted distances corresponds to a low-contrast image, determining an edge image by applying an edge detection operator to the original image, and considering both the contrast of the original image and the contrast of said edge image when determining said characteristic measure ($\Delta$), and said histogram equalization amount is varied by scaling the difference between the HE transformation curve and a unity straight transformation curve by means of a gain factor, whereby the smaller the gain factor is chosen, the lower the histogram equalization amount will be.

12. Method according to claim 11, characterized by scaling the luminance levels of the image after the histogram equalization by the ratio of the mean luminance levels of the image before and after the histogram equalization.

13. Method according to claim 11, characterized by shifting the luminance levels of the image after the histogram equalization by the difference of the mean luminance levels of the image before and after the histogram equalization.

14. Method according to claim 11, characterized by correcting the luminance levels of the image after the histogram equalization according to the luminance level shift of the histogram peaks or a selected reference point caused by the histogram equalization.

15. Method according to claim 1, characterized by modifying the HE transformation curve in a way that for a certain range of luminance levels, said HE transformation curve is replaced by a unity straight transformation curve.

16. Contrast enhancement unit for improving the contrast of digital images said digital images comprising a multitude of pixels with each pixel being assigned a luminance level, characterized by:
    histogram determination means, which determine a histogram indicating the luminance level distribution of an original image;
    contrast determination means, which determine a characteristic measure ($\Delta$) of the contrast of the original image;
    histogram equalization means, which equalize the histogram of the original image in order to improve the contrast, whereby the histogram equalization amount is varied as a function of said characteristic measure ($\Delta$) and
    characterized in that said contrast determination means comprise means for determining an edge image by applying an edge detection operator to the original image, whereby both the contrast of the original image and the contrast of said edge image are considered when determining said characteristic measure ($\Delta$).

17. Contrast enhancement unit according to claim 16, characterized in that said histogram equalization means comprise low-pass filtering means for subjecting the histogram to a low-pass filtering operation before the HE transformation curve is generated.

18. Contrast enhancement unit according to claim 17, characterized in that in order to vary the histogram equalization amount, the cut-off frequency ($fg$) of said low-pass filtering means is varied according to said characteristic measure, whereby the larger the cut-off frequency ($fg$) is chosen, the larger the amount of histogram equalization will be.

19. Contrast enhancement unit according to claim 18, characterized in that said histogram equalization means comprise Fourier transformation means for Fourier transforming the histogram into the frequency domain, whereby the low-pass filtering operation is carried out in the frequency domain, or said histogram equalization means comprise a forward and reverse IIR filter for carrying out the low-pass filtering by a forward and reverse IIR filtering operation.

20. Contrast enhancement unit according to claim 19, characterized in that said low-pass filtering means comprise a lookup table, in which a Fourier transformed low-pass filter characteristic is stored.

21. Contrast enhancement unit according to claim 16, characterized in that said histogram equalization amount is varied by interpolating between a first low-pass filtered histogram corresponding to a first cut-off frequency ($fg1$), and a second low-pass filtered histogram corresponding to a second cut-off frequency ($fg2$) when determining said HE transformation curve.

22. Contrast enhancement unit according to claim 16, characterized in that said histogram equalization amount is varied by scaling the difference between the HE transformation curve and a unity straight transformation curve by means of a gain factor, whereby the smaller the gain factor is chosen, the lower the histogram equalization amount will be.

23. Contrast enhancement unit according to claim 22, characterized by brightness change compensation means, which compensate the brightness change of the image caused by the histogram equalization in a way that the image's mean luminance level after the histogram equalization is equal to the mean luminance level of the original image.

24. Contrast enhancement unit according to claim 23, characterized by means for modifying the HE transformation curve in a way that for a certain range of luminance levels, said HE transformation curve is replaced by a unity straight transformation curve.

* * * * *